(12) United States Patent
Jin et al.

(10) Patent No.: US 11,558,205 B2
(45) Date of Patent: Jan. 17, 2023

(54) SCALABLE CERTIFICATE REVOCATION TRUTH DISTRIBUTION AND VERIFICATION USING A BLOOM FILTER SET AND A FALSE POSITIVE SET FOR PKI-BASED IOT SCENARIOS

(71) Applicant: GM GLOBAL TECHNOLOGY OPERATIONS LLC, Detroit, MI (US)

(72) Inventors: Jingwen Jin, Rochester, MI (US); David W. Racklyeft, Troy, MI (US); Amandeep Dhaliwal, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 17/038,116

(22) Filed: Sep. 30, 2020

(65) Prior Publication Data

US 2022/0103380 A1 Mar. 31, 2022

(51) Int. Cl.
*H04L 9/32* (2006.01)
*G16Y 30/10* (2020.01)
*H04W 4/46* (2018.01)

(52) U.S. Cl.
CPC ............ *H04L 9/3268* (2013.01); *G16Y 30/10* (2020.01); *H04L 9/3236* (2013.01); *H04W 4/46* (2018.02); *H04L 2209/80* (2013.01)

(58) Field of Classification Search
CPC ................ H04L 9/3268; H04L 9/3236; H04L 2209/80; G16Y 30/10; H04W 4/46
See application file for complete search history.

(56) References Cited

U.S. PATENT DOCUMENTS

| | | | |
|---|---|---|---|
| 2014/0373118 A1* | 12/2014 | Doi | H04L 9/3268 726/6 |
| 2020/0366667 A1* | 11/2020 | Cebe | H04L 9/302 |
| 2020/0396061 A1* | 12/2020 | Locketz | H04L 9/0643 |

* cited by examiner

*Primary Examiner* — Nelson S. Giddins
(74) *Attorney, Agent, or Firm* — Harness, Dickey & Pierce, P.L.C.

(57) ABSTRACT

A first IoT device includes a memory, a transceiver, bloom filter evaluation, false positive comparison and control modules. The memory stores: a bloom filter set including an array of bits representing entries in a certificate revocation list; and a false positive set including a list of certificate entries falsely identified as being revoked. The transceiver receives from a second IoT device a message including a certificate. The bloom filter evaluation module receives the bloom filter set from a back office station and determines whether an identifier associated with the certificate is in the bloom filter set. The false positive comparison module receives the false positive set from the back office station and determines whether the identifier is in the false positive set. The control module permits communication between the first and second IoT devices based on whether the identifier is in the bloom filter and false positive sets.

20 Claims, 7 Drawing Sheets

SCALABLE CERTIFICATE REVOCATION TRUTH DISTRIBUTION AND VERIFICATION USING A BLOOM FILTER SET AND A FALSE POSITIVE SET FOR PKI-BASED IOT SCENARIOS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to Internet of things (IoT) communication, which may include vehicle-to-vehicle (V2V) communication, and more particularly to distributing and verifying certificates revocation truth/status of IoT devices and modules.

A vehicle control module may include one or more security processor chips, memory, a transceiver, and/or other circuit components. A vehicle may include multiple vehicle control modules. Some vehicle control modules need security credentials in order to perform certain functions. As an example, a vehicle-to-vehicle (V2V) control module of a first vehicle communicates with other V2V control modules of other vehicles. In order to perform this communication, the V2V control module of the first vehicle needs to have public certificates signed by a trusted certificate authority in order to communicate with the other V2V control modules. The public certificates and their corresponding private keys are needed in order to digitally sign and verify authenticity of messages (e.g., basic safety messages) being broadcast at a rate of, for example, 10 times per second. The messages are picked up by nearby vehicles and used to determine information associated with the vehicle sending the messages; other nearby vehicles; and/or other nearby objects. The messages can include vehicle locations, vehicle speeds, vehicle headings, information regarding other nearby objects, indicators of whether vehicles are braking, and/or other status information.

According to V2V communication protocols, each of the messages, transmitted from a first V2V module of a first vehicle to a second V2V module of a second vehicle, needs to be signed using a private key that is unique to the first V2V module. In addition, each of the messages needs to include a signed public certificate, which includes a public key of the first V2V module. The second V2V module obtains the public key based on the signed public certificate. The second V2V module verifies the signature of the corresponding message using the public key to determine if the message was signed by the appropriate private key. The second V2V module also verifies that the date of the certificate has not expired. Finally, the second V2V module verifies that the certificate has not been revoked. If any of these verifications fail, then the second V2V module may disregard messages coming from the first V2V module.

SUMMARY

A first Internet of things (IoT) device is provided and includes a memory, a transceiver, a bloom filter evaluation module, a false positive comparison module and a control module. The memory is configured to store: a bloom filter set including an array of bits representing entries in a certificate revocation list; and a false positive set including a list of certificate entries falsely identified as being revoked according to the bloom filter set. The transceiver is configured to receive from a second IoT device a message, where the message includes a certificate. The bloom filter evaluation module is configured to receive the bloom filter set from a back office station and determine whether an identifier associated with the certificate is deemed to be in the bloom filter set. The false positive comparison module is configured to receive the false positive set from the back office station and determine whether the identifier is in the false positive set. The control module is configured to permit communication between the first IoT device and the second IoT device based on whether the identifier is deemed to be in the bloom filter set and whether the identifier is in the false positive set.

In other features, the control module is configured to, in response to the identifier being deemed to not be in the bloom filter set, permit communication between the first IoT device and the second IoT device.

In other features, the control module is configured to, in response to the identifier being in the false positive set, permit communication between the first IoT device and the second IoT device.

In other features, the control module is configured to, in response to the identifier being deemed to be in the bloom filter set and not be in the false positive set, add the identifier to a potential false positive list and at least temporarily disregard messages coming from the second IoT device.

In other features, the control module is configured to: transmit the potential false positive list to the back office station; and receive at least one of an updated version of the bloom filter set or an updated version of the false positive set.

In other features, the control module is configured to determine whether to communicate with the second IoT device based on at least one of the updated version of the bloom filter set and the updated version of the false positive set.

In other features, the false positive set includes identifiers of certificates not in the certificate revocation list but in one or more potential false positive lists generated by the first IoT device, the second IoT device, or one or more other IoT devices.

In other features, the control module is implemented as a vehicle-to-vehicle communication module of a vehicle.

In other features, the bloom filter evaluation module comprises a bloom filter and is configured to, using the bloom filter, determine whether an identifier associated with the certificate is deemed to be in the bloom filter set.

In other features, the bloom filter evaluation module includes a bloom filter. The bloom filter includes hash functions. The hash functions determine respective bit locations in the array of bits for the identifier. The bloom filter evaluation module determines the identifier to be in the bloom filter when all bits at the bit locations of the array of bits are set to 1.

In other features, a system is provided and includes: the first IoT device of claim 1; and the back office station comprises a bloom filter, where the bloom filter is configured to generate the bloom filter set based on the entries in the certificate revocation list.

In other features, the back office station includes: a memory configured to store the certificate revocation list, the bloom filter set, and the false positive set; a certificate revocation module configured to generate and store in the memory the certificate revocation list; and a false positive module configured to generate the false positive set based on a set of potential false positive list received from the first IoT device and other IoT devices.

In other features, the bloom filter evaluation module includes a second bloom filter. The second bloom filter is configured similarly or the same as the first bloom filter. The bloom filter evaluation module is configured to determine if the identifier is in the bloom filter set using the second bloom filter.

In other features, a back office station includes a memory, a certificate revocation module, a bloom filter, a false positive module and a control module. The memory is configured to store a certificate revocation list, a bloom filter set, and a false positive set, wherein the certificate revocation list includes a revoked certificate ID of a first Internet of Thing (IoT) device. The certificate revocation module is configured to generate and store in the memory the certificate revocation list. The bloom filter module includes a bloom filter and configured to generate the bloom filter set based on the certificate revocation list using the bloom filter, where the bloom filter set is an array of bits representative of the certificate revocation list. The false positive module is configured to generate the false positive set based on a first potential false positive list received from a second IoT device. The false positive set includes identifiers associated with certificates not in the certificate revocation list but in one or more potential false positive lists. The one or more false positive lists includes the first potential false positive list. The false positive set includes an identifier of a third IoT device. The control module is configured to transmit the bloom filter set and the false positive set to the second IoT device to prevent communication with the first IoT device and permit communication with the third IoT device.

In other features, the control module operates in: a first state to initialize the bloom filter set and distribute the bloom filter set to at least the second IoT device and the third IoT device; a second state, while the bloom filter set exists and the false positive set is an empty set, update the false positive set based on the first potential false positive list and distribute the false positive set to at least the second IoT device and the third IoT device; a third state, while the bloom filter set exists and the false positive set is not an empty set, update the false positive set based on the first potential false positive list and distribute the false positive set to at least the second IoT device and the third IoT device; and a fourth state to update the bloom filter set and the false positive set and distribute the updated bloom filter set and the updated false positive set to at least the second IoT device and the third IoT device.

In other features, the certificate revocation module is configured to update the certificate revocation list. The bloom filter module is configured to periodically update the bloom filter set based on the updated certificate revocation list.

In other features, for each entry in the first potential false positive list, the control module is configured to: check if the entry is in the bloom filter set and the certificate revocation list; and, in response to the entry being in the bloom filter set and not in the certificate revocation list, update the false positive set to include the entry.

In other features, the control module is configured to, in response to receiving a new entry for the certificate revocation list, update the bloom filter set based on the new entry and remove the new entry from the false positive set if present.

In other features, the bloom filter includes hash functions. The hash functions are each configured to determine bit locations in the array of bits based on entries in the certificate revocation list. The bloom filter module is configured to set bits at the bit locations to 1 based on outputs of the plurality of hash functions.

In other features, the bloom filter module is configured to: identify bit locations in the array of bits for an identifier of a certificate of the third IoT device; and determine whether the identifier of the certificate of the third IoT device is in the bloom filter set based on the identified bit locations in the array of bits for the identifier; and communicate with the third IoT device in response to the identifier of the certificate of the third IoT device not being in the bloom filter set.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
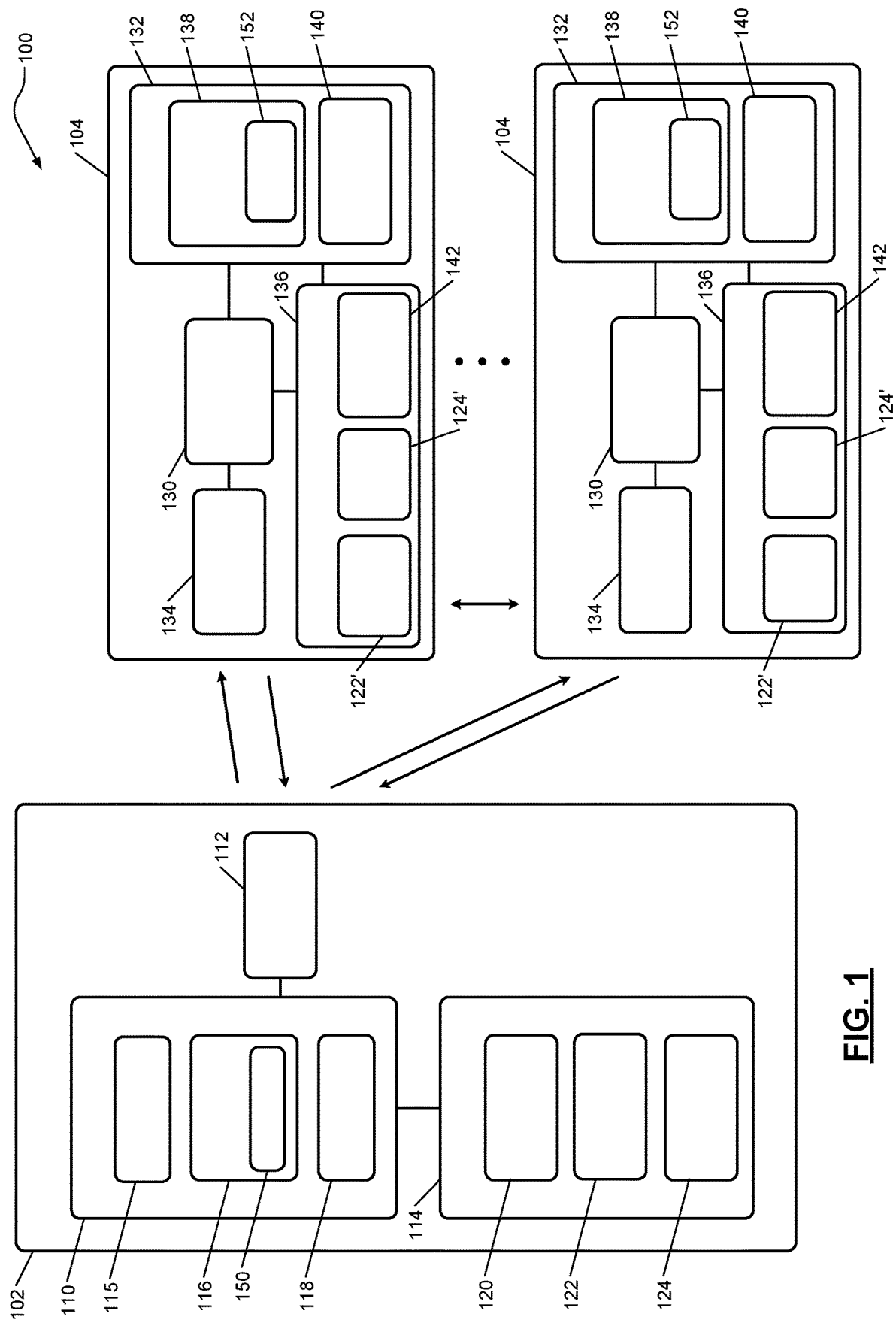
FIG. 1 is a functional block diagram of an example of a security system incorporating a back office station and Internet of things (IoT) devices in accordance with the present disclosure.

During communication between V2V communication modules (hereinafter referred to as "V2V modules") of two vehicles, messages are transmitted from a sending V2V module to a receiving V2V module. Each of the messages transmitted by the sending V2V module includes a certificate that is verified by the receiving V2V module. The receiving V2V module uses the public key from the certificate to verify the signature in the message, and determines (i) whether the certificate was signed by a trusted certificate authority, (ii) whether the certificate has not expired, and (iii) whether the certificate has not been revoked. As an example, a certificate may be revoked because the certificate has been determined to be used by an attacking device and/or for some other reason. The back office station may store a certificate revocation list (CRL) that includes a list of revoked certificate identifiers (IDs) and periodically broadcast the full CRL to the V2V modules. The receiving V2V module may compare a certificate ID of the sending V2V module to certificate IDs in the CRL. If the certificate ID is in the CRL, then the certificate has been revoked and is invalid. If, for example, the certificate of the sending V2V module has been revoked, then the receiving V2V module disregards status information in the received message.

A CRL may include millions of certificate IDs, which requires a large amount of memory to store the CRL. As an example, in the U.S. there are over 250 million vehicles. An example revocation rate of certificates for these vehicles may be 1% or 2.5 million vehicles. If each revocation entry in the CRL includes 40 bytes, then 100 megabytes (MB) is needed to store the CRL. A typical vehicle has a limited amount of memory space and processing resources, is periodically traveling at high speeds, and can have limited and/or intermittent Internet connectivity. A large data exchange between the back office station and the vehicle to obtain the CRL is transmission costly in terms of time and bandwidth.

To account for the moving speed of the vehicle, certificate revocation checking response time for the vehicle should be less than 100 milliseconds (ms). This is needed in order for a receiving V2V module to quickly determine whether a certificate of a sending V2V module is valid and when valid have an appropriate amount of time remaining to perform vehicle operations. The vehicle operations may include safety operations such as control vehicle acceleration or deceleration, control vehicle steering, provide an alert message to a driver, etc. The vehicle operations may be performed based on safety and/or status information received from the sending V2V module.

For at least the above-stated reasons, broadcasting a CRL to V2V modules for certificate revocation checking provides a solution with poor scalability to scenarios with many V2V modules. Also, system performance in checking certificate revocation status is poor and inefficient due to the stated vehicle constraints and the size of the CRL. A CRL that includes 100 MB of data, not only requires a large amount of memory space for storage, but also requires a large number of processing cycles to search the entries in the CRL and determine whether a particular certificate ID is in the CRL or not. The memory, processing resources, computing power, and types of devices needed to receive and process based on a large CRL in less than 100 ms are costly and often not feasible. A security break and a loss of functionality can occur in an environment with many V2V modules, where the individual V2V modules are incapable of hosting and/or searching through a large CRL in the time permitted.

The examples set forth herein include techniques for efficiently performing certificate revocation checks at V2V modules that have limited storage space, limited computing power, and lack of consistent and reliable network connectivity with a remotely located back office station. The examples provide certificate revocation status in real-time (i.e. less than, for example, 100 ms). Certificate revocation status is able to be determined locally and efficiently at the V2V modules in both time and storage space.

The examples set forth herein include a back office station broadcasting certificate revocation truth data in the form of a bloom filter set (BFS) and a false positive set (FPS). The BFS refers to an array of bits generated based on a CRL. The FPS may include zero or more entries of certificate IDs (or vehicle IDs) that have been identified by one or more of the V2V modules as being in the BFS but identified by the Back Office as a false positive based on the full CRL. The V2V modules perform certificate revocation checks based on the BFS and the FPS, which includes a significantly smaller amount of data than in the corresponding CRL. If, for example, a certificate ID is determined to not be in the BFS, then the certificate has not been revoked. If the certificate ID is determined to be in the BFS, then the receiving V2V module checks the FPS. If in the FPS, then the certificate is not revoked. If the certificate is not revoked, the content of the sending V2V module's message is processed by the receiving V2V module.

If the certificate ID is in the BFS and not in the FPS, the certificate ID is placed on a potential false positive list of the receiving V2V module. The receiving V2V module then at least temporarily ignores messages from the sending V2V module and shares the potential false positive list to the back office station. In response, the back office station verifies whether the certificate ID is revoked based on the CRL. Results of this verification are reported to the receiving V2V module and other V2V modules as part of an updated FPS. The V2V module may determine whether to process messages from the sending V2V module based on an updated FPS received from the back office station.

Each of collective BFS and FPS pair is significantly smaller than the size of a corresponding CRL and thus requires significantly less memory. V2V modules with limited resources are able to store and process the BFSs and FPSs in an efficient manner to provide quick certificate revocation checks. The disclosed examples are scalable to environments with many V2V modules and are applicable to Internet of things (IoT) devices as further described below.

FIG. 1 shows a security system 100 incorporating a back office station 102 and Internet of things (IoT) devices 104. The back office station 102 may be a server of a service provider. The IoT devices 104 may refer to vehicles, components of vehicles, appliances, mobile network devices, wearable devices, machines, tools, base stations, beacons, and/or other network devices that are part of a public key infrastructure. The back office station 102 includes a control module 110, a transceiver 112, and a memory 114. The control module 110 includes a CRL module 115, a bloom filter module 116 and a FPS module 118. The memory 114 stores a CRL 120, a BFS 122 and a FPS 124. Each of the IoT devices 104 includes a control module 130, an IoT module 132, a transceiver 134 and a memory 136. The IoT module 132 may be implemented as part of the control module 130. Each of the IoT modules 132 includes a BFS evaluation module 138 and a FPS comparison module 140. The memory 136 may store a latest received version of the BFS 122', a latest received version of the FPS 124' and a potential false positive (FP) list 142. Each of the memories 136 stores a respective potential FP list that is generated by the corresponding BFS evaluation modules 138 and FPS comparison module 140.

The CRL module 115 of the back office station 102 maintains and updates the CRL 120. The bloom filter module 116 includes a bloom filter 150 and generates and updates the BFS 122 based on the CRL 120 using the bloom filter 150. The FPS module 118 maintains and updates the FPS 124 based on the CRL 120. The control module 110 provides the BFS 122 and the FPS 124 to the IoT devices 104 via the transceiver 112. The IoT modules 132, via the modules 138, 140, are then able to perform certificate revocation checks based on the BFS 122 and FPS 124. The BFS evaluation modules 138 include bloom filters 152, which may each be configured similarly or the same as the bloom filter 150. The bloom filters 152 are used to determine if certificate IDs of BSMs are in the BFS 122'. The IoT devices 104 generate the potential FP lists 142, based on inclusion of the certificate IDs in the BFS 122' and/or in the FPS 124', and periodically send the potential FP lists 142 to the back office station 102 for verification and updating of the FPS 124. The updated FPS is then shared with the IoT devices 104. These operations are further described below.

Figure 2:
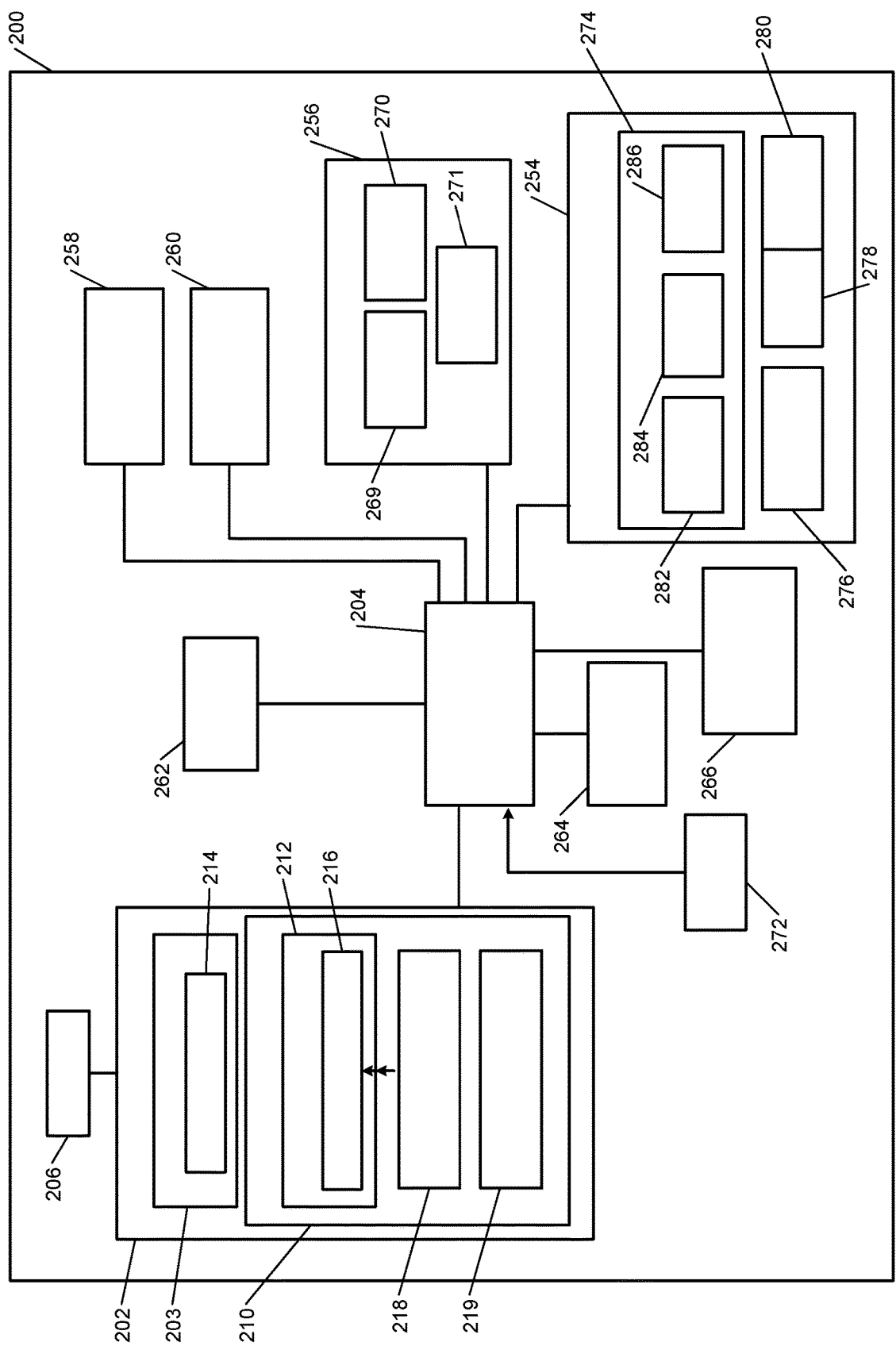
FIG. 2 is a functional block diagram of an example of a vehicle including a V2V module in accordance with the present disclosure.

FIG. 2 shows a vehicle 200 including a V2V module 202 and other modules, such as vehicle control modules 204. Although the vehicle 200 is shown as having multiple vehicle control modules, the vehicle 200 may have a single vehicle control module. The V2V module is an example of one of the IoT modules 132 of FIG. 1. Also, although the V2V module 202 is shown as being connected to a transceiver 206 and the vehicle control modules 204, the V2V module 202 may be connected to one or more of the devices and systems to which the vehicle control modules 204 are connected.

The V2V module 202 performs vehicle-to-vehicle communication via the transceiver 206. The V2V module 202 includes memory 203, which stores a credential package 214, which may be generated by a certificate authority network device. The credential package includes signed public certificates. The signed public certificates include respective public keys.

The V2V module 202 also includes a security processor chip 210, which has memory 212. The memory 212 stores private/public key pairs 216 generated by the security processor chip 210 prior to being installed on the V2V module 202. The security processor chip 210 may also include a BFS evaluation module 218 and a FPS comparison module 219 that operate similarly as the modules 138, 140 of FIG. 1. The V2V module 202 may generate alert signals to alert a driver of the vehicle 200. The alert signals may be provided via, for example, the infotainment system 262.

The vehicle control modules 204 may control operations of various vehicle systems. The V2V module 202 may transmit information received from the vehicle control modules 204 regarding, for examples, statuses of the stated systems to other V2V modules of other vehicles. The vehicle systems may include a propulsion system 254, an air-conditioning system 256, seat systems 258, lighting systems 260, infotainment system 262, navigation system 264, and/or other vehicle systems 266, such as a braking system, a communication system, etc. The vehicle control modules 204 may execute applications and corresponding functions to control the vehicle systems. The vehicle systems may include actuators. For example, the air-conditioning system 256 may include one or more pump(s) 269, heaters 270, and fans 271. This control may be based on signals from sensors 272 and may include wireless communication via the transceiver 206 and/or other transceiver. The propulsion system 254 may include an engine 274, a transmission 276, one or more motors 278, and a power source (e.g., a battery system) 280. The engine 274 may include a throttle system 282, an ignition system 284, and a fuel system 286.

Figure 3:
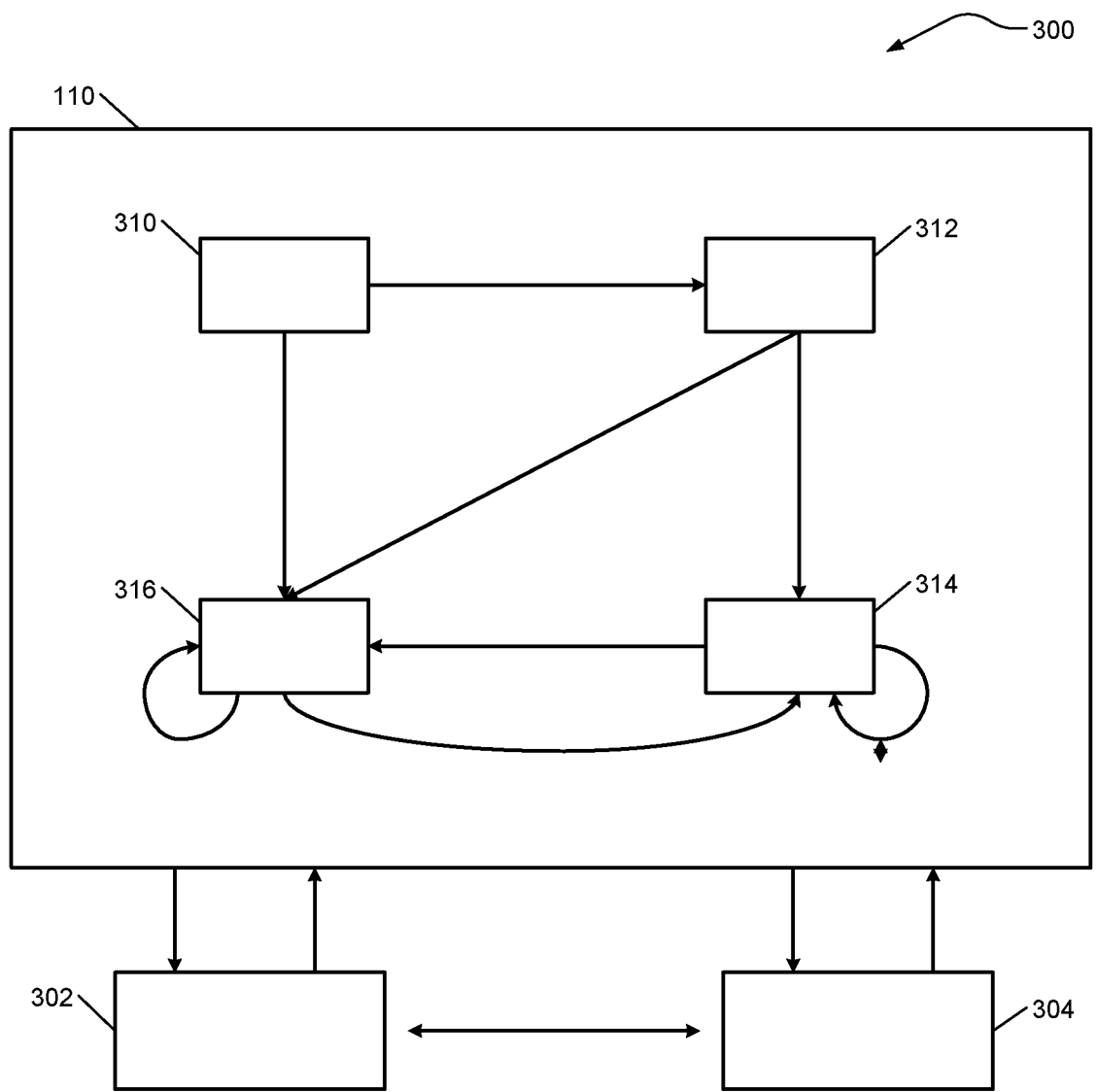
FIG. 3 is a functional block diagram of an example of a V2V security system illustrating states of a back office control module in accordance with the present disclosure.

FIG. 3 shows a V2V security system 300 illustrating states of the back office control module 110 of FIG. 1 and includes V2V modules 302, 304. Although two V2V modules are shown, the back office station 102 may communicate with any number of IoT (or V2V) modules, where each IoT module is implemented in a respective network device or vehicle. The back office control module 110 may start at State 1 and initialize a bloom filter to provide a bloom filter set (BFS) and distribute the BFS to the V2V module and/or other IoT module. The BFS includes an array of bits representing a particular CRL. The bloom filter is a space-efficient probabilistic data structure that is used to test whether an element (or entry e) is a member of a set S quickly. The bloom filter allows for time and space (storage space) efficient determination of whether a certificate ID, IoT ID and/or vehicle ID are in a CRL without checking the CRL. When using a bloom filter, false positives are possible and false negatives are not possible. ID entries may be added to a BFS and/or a BFS may be queried to determine if an ID is in the BFS. Nomenclature for adding entries to a set is $(S \cup \{e_1\}, S \cup \{e_2\}, S \cup \{e_3\}, \ldots, S \cup \{e_n\}$, where $e_n$ are entries and n is an integer. Nomenclature for querying a BFS is to determine if an ID is possibly in an ith entry of a set S is $(e_i \in S?)$.

Figure 4:
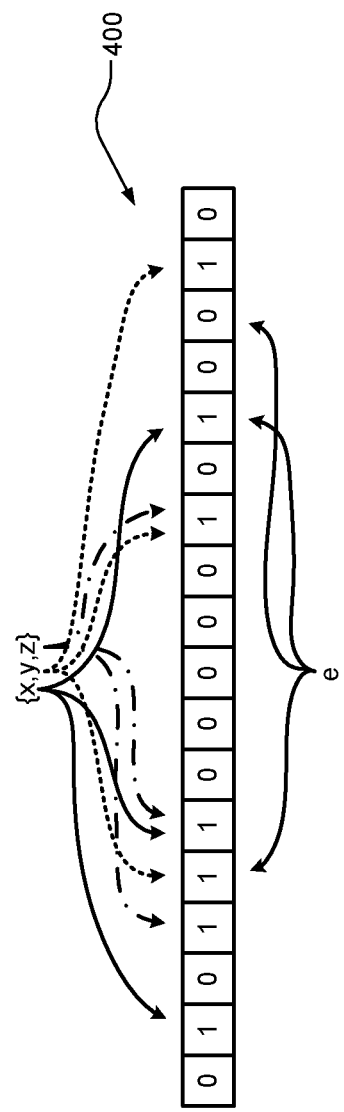
FIG. 4 is an example of a bloom filter array in accordance with the present disclosure.

FIG. 4 shows an example bloom filter array 400. In the example shown, the bloom filter array 400 has 18 bits, but may include a different number of bits m. The bloom filter may have a predetermined number of different hash functions k that are used to set bit values in the bloom filter array 400, where k<<m. Each of the hash functions maps or hashes an element to one of the m array positions, thereby generating a uniform random distribution. At an initial state, all bits of the array are 0, meaning the set S (or BFS) is empty. To add an element (or ID entry) e, the ID entry is provided to each of the k hash functions to obtain k array positions and the bits at the k array positions are set to 1. For example, in FIG. 4, entries x, y, and z are received and hashed to provide corresponding positions in the bloom filter array 400. For the example shown, the bloom filter has 3 hash functions and as a result provides 3 positions for each of the entries x, y, z.

To query for an element (or ID entry) e in the set S (or BFS), also referred to as determining whether the ID entry is in the bloom filter, the entry e is fed to each of the k hash functions to get the corresponding k array positions. This is illustrated in FIG. 4. If any of the bits at the provided positions is 0, then the entry e is not in the set. If all of the bits at the provided positions is 1, then either the entry e is in the set or the bits have by chance been set to 1 during the insertion of other entries, resulting in a false positive. In the example shown in FIG. 4, the entry e is not one of the entries x, y, z because it hashes to a bit array position containing a 0, whereas the positions for x, y, z all are set to 1.

The query time for a bloom filter is constant and the complexity is represented as O(k). For a Bloom filter of fixed array size, the more elements (or entries) that are added to the BFS, the higher the probability of false positives. The accuracy of a bloom filter depends on the size of the filter (i.e. the number of bit positions), the number of hash functions k used in the filter, and the number of elements n added to the BFS. Typically k is constant and much smaller than m, which is proportional to the number of elements to be added. The selection of k and the constant of proportionality m may be determined by a desired false positive probability rate p of the bloom filter. The false positive probability rate p may be represented by equation 1.

$$p = \left(1 - \left[1 - \frac{1}{m}\right]^{km}\right)^k \approx (1 - e^{-kn/m})^k \quad (1)$$

A bloom filter with 1% error and an appropriately set value of k, in contrast, requires approximately 9.6 bits in the array per entry, regardless of the size of the entries. This advantage is mostly due to the small size of the BFS and partly due to the probabilistic nature of the bloom filter. The 1% false positive rate may be reduced by a factor of ten by adding approximately 4.8 bits in the array per entry. For a given m and n, the value of k that minimizes the false positive probability rate p may be represented by equation 2.

$$k = \frac{m}{n}\ln 2 \approx \frac{9m}{13n} \quad (2)$$

Table 1 below is an example of false positive probability rates for different m, n, and k values. The m, n and k values may be selected and/or adjusted depending on the application. Table 1 provides false positive probability rates for different ratios of m/n (2-16) and k values (1-8). Column 2 of Table 1 also includes k values for m/n values 2-16 according to equation 2. The block in row 10, column k=7 is an example of m, n, and k values that provide efficient processing while having a low probability of false positives and using a minimal amount of memory space. The shaded block also corresponds to the example of Table 2.

TABLE 1

False Positive Probability Rates for m, n and k values.

| m/n | k | k = 1 | k = 2 | k = 3 | k = 4 | k = 5 | k = 6 | k = 7 | k = 8 |
|---|---|---|---|---|---|---|---|---|---|
| 2 | 1.39 | 0.393 | 0.400 | | | | | | |
| 3 | 2.08 | 0.283 | 0.237 | 0.253 | | | | | |
| 4 | 2.77 | 0.221 | 0.155 | 0.147 | 0.160 | | | | |
| 5 | 3.16 | 0.181 | 0.109 | 0.092 | 0.092 | 0.101 | | | |
| 6 | 4.16 | 0.154 | 0.0804 | 0.0609 | 0.0561 | 0.0578 | 0.0638 | | |
| 7 | 4.85 | 0.133 | 0.0618 | 0.0423 | 0.0359 | 0.0347 | 0.0364 | | |
| 8 | 5.55 | 0.118 | 0.0489 | 0.0306 | 0.024 | 0.0217 | 0.0216 | 0.0229 | |
| 9 | 6.24 | 0.105 | 0.0397 | 0.0228 | 0.0166 | 0.0141 | 0.0133 | 0.0135 | 0.0145 |
| 10 | 6.93 | 0.0952 | 0.0329 | 0.0174 | 0.0118 | 0.00943 | 0.00844 | 0.00819 | 0.00846 |
| 11 | 7.62 | 0.0869 | 0.0276 | 0.0136 | 0.00864 | 0.0065 | 0.00552 | 0.00513 | 0.00509 |
| 12 | 8.32 | 0.08 | 0.0236 | 0.0108 | 0.00646 | 0.00459 | 0.00371 | 0.00329 | 0.00314 |
| 13 | 9.01 | 0.074 | 0.0203 | 0.00875 | 0.00492 | 0.00332 | 0.00255 | 0.00217 | 0.00199 |
| 14 | 9.7 | 0.0689 | 0.0177 | 0.00718 | 0.00381 | 0.00244 | 0.00179 | 0.00146 | 0.00129 |
| 15 | 10.4 | 0.0645 | 0.0156 | 0.00596 | 0.003 | 0.00183 | 0.00128 | 0.001 | 0.000852 |
| 16 | 11.1 | 0.0606 | 0.0138 | 0.005 | 0.00239 | 0.00139 | 0.000935 | 0.000702 | 0.000574 |

Referring again to FIG. 3, during State 1 (indicated by box 310), the bloom filter module 116 initializes the bloom filter 150 with predetermined parameter values of m, n and k. The number of hashing functions k and the number of bits n allocated per element is set and is dependent on the selected false positive probability rate p. The false positive probability rate p may be selected based on the available resources, such as memory and processing power of the IoT device and/or vehicle. For each entry e in the CRL, the entry e is added to the bloom filter by setting bits of the bloom filter array as described above.

The control module 110 may periodically operate in the following States 2-3. The control module 110 operates in State 2 (indicated by box 312), when there is an existing BFS and no existing FPS and a potential FP list is received from one of the V2V modules 302, 304. The FPS module 118 generates a new FPS based on the potential FP list and distributes the FPS to the V2V modules 302, 304 and may distribute it to other V2V modules. During State 2, the FPS module 118 collects the potential FP lists from the V2V modules. The FPS may be initialized as an empty set, represented as FPS={ }. For each false positive entry (fpe) in each of the potential FP lists, the FPS module 118 checks if the fpe is in a CRL and/or in the BFS. If the fpe is in the BFS (fpe∈BFS) and not in the CRL (fpe∈CRL), then the fpe is included in the FPS, which is represented as FPS∪{fpe}.

The control module 110 operates in State 3 (indicated by box 314) when a BFS and a FPS exist (i.e. have been generated) and a new potential FP lists is received. The FPS module 118 updates the existing FPS and distributes the updated FPS to the V2V modules 302, 304 and may distribute the FPS to other V2V (or IoT) modules. The FPS module 118 collects the potential FP lists from the V2V modules. For each entry fpe in the potential FP lists, the FPS module 118 checks if the fpe is in the CRL and the BFS. If fpe∈BFS and fpe∉CRL, then the FPS∪{fpe}.

The control module 110 operates in State 4 (indicated by box 316) when updating an existing BFS and optionally an FPS if the FPS exists and distributes the updated BFS and optionally the updated FPS to the V2V modules 302, 304. The updated BFS and FPS may also be distributed to other V2V (or IoT) modules. For each new certificate entry e in the CRL, the entry e is added to the BFS and if the entry e∈FPS, then the entry e is removed from the FPS, which is represented as FPS=FPS\{e}.

The control module 110 may periodically transition from State 1 to State 2 if a new potential FP list is received. The control module 110 may periodically transition from State 2 to State 3 if a new potential FP list is received. The control module 110 may periodically transition from State 2 to State 4 if a new CRL entry is received. The control module 110 may periodically transition from State 3 to State 4 if a new CRL entry is received. The control module 110 may periodically remain in State 3 if a new potential FP list is received. The control module 110 may periodically transition from State 4 to State 0 if a new potential CRL entry is received. The control module 110 may periodically transition from State 4 to State 3 if a new potential FP list is received. The control module 110 may periodically remain in State 4 if a new CRL entry is received.

The V2V modules 302, 304 periodically receive from the back office station 102 and save a BFS and a FPS. Each of the V2V modules evaluates a certificate ID (or vehicle ID) of an incoming message received. The ID may be referred to as an entry c. The evaluation includes querying the BFS. If c∉BFS, then the entry c is determined to not be revoked. If c∈BFS, then the entry c may be revoked or the BFS query result was a false positive. If c∈BFS, then the entry c is checked against the FPS. If c∈FPS, then the entry c is not revoked. If c∉FPS, then the entry c is revoked or assumed to be revoked and the entry c is added to the potential FP lists of the V2V modules. The V2V modules periodically send the potential FP lists to the back office station 102.

Figure 5:
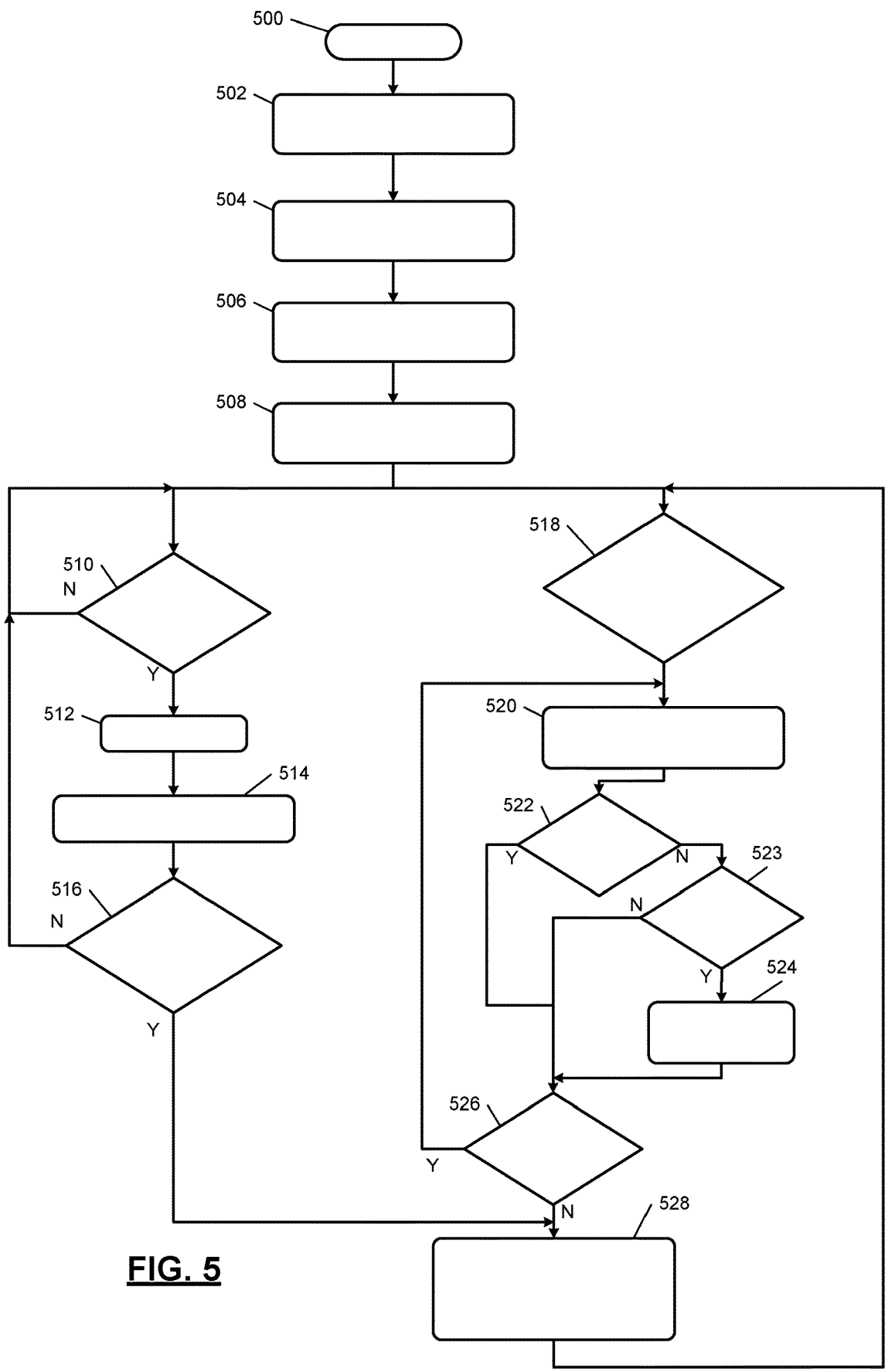
FIG. 5 illustrates an example operational method of a back office control module in accordance with the present disclosure.
Figure 6:
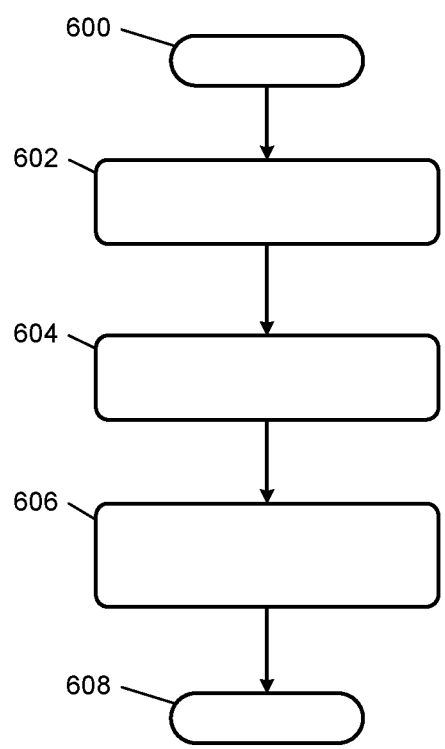
FIG. 6 illustrates an example operational method of a sending IoT (or V2V) module in accordance with the present disclosure.
Figure 7:
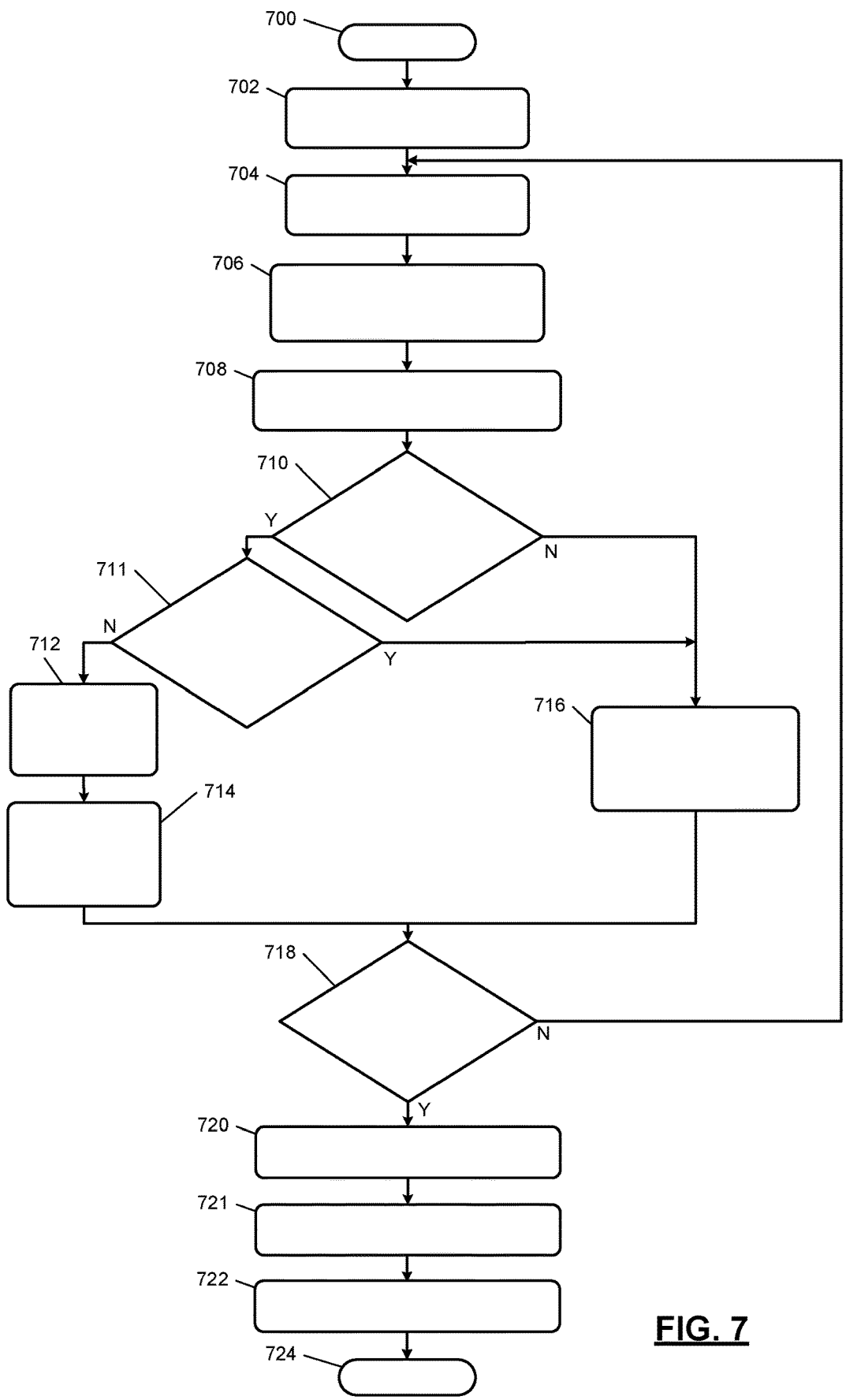
FIG. 7 illustrates an example operational method of a receiving IoT (or V2V) module in accordance with the present disclosure.

The systems disclosed herein may be operated using numerous methods, example methods are illustrated in FIGS. 5-7. FIG. 5 shows an operational method of a back office control module. FIG. 6 shows an operational method of a sending IoT (or V2V) module. FIG. 7 shows an operational method of a receiving IoT (or V2V) module.

Although the following methods are primarily described with respect to a V2V example including V2V modules, the methods may be similarly implemented for other IoT modules. Also, although the following methods are shown as separate methods, the methods and/or operations from separate methods may be combined and performed as a single method. The method of FIG. 5 may be performed while performing the methods of FIGS. 6 and 7.

Although the following operations are primarily described with respect to the implementations of FIGS. 1-4, the operations may be easily modified to apply to other implementations of the present disclosure. The operations of FIGS. 5-7 may be iteratively performed. The method of FIG. 5 may begin at 500. At 502, the CRL module 115 generates and stores an initial CRL. This may include the CRL module receiving ID entries corresponding to respective certificates from, for example, a network device of a supplier facility, which may periodically occur. The ID entries in the CRL 120 may be certificate IDs, IoT IDs and/or vehicle IDs.

At 504, the bloom filter module 116 uses a probabilistic data structure referred to as the bloom filter 150 to compute a BFS 122, which is an array of bits that represent the CRL 120. At 506, the bloom filter module 116 distributes the BFS to IoT modules, such as the modules 132, 302, 304 and/or other IoT modules.

At 508 and to overcome a shortcoming of the bloom filter 150, which has a small false positive rate, the FPS module 118 generates the FPS 124. Initially the FPS 124 may be generated as an empty set (i.e. does not include any entries). The FPS 124 is later updated based on the potential FP lists 142 generated by the IoT modules to include entries.

At 510, the CRL module 115 determines if a new CRL entry and/or other update has been received. The CRL module 115 may periodically receive additional entries for the CRL and/or other updates. If an update has been received, operation 512 is performed.

At 512, the CRL module 115 updates the CRL 120 based on the received update. This may include adding a new ID entry to the CRL 120 and/or updating, changing or removing a current ID entry. At 514, the bloom filter module 116 may update the BFS 122 via the bloom filter 150 based on the changes to the CRL that occurred at 512.

At 516, the control module 110 may determine if a predetermined period has lapsed since sending a last version of the BFS 122 and the FPS 124 to the IoT modules. If yes, operation 528 may be performed, otherwise operation 510 may be performed. The back office control module 110 periodically sends latest and/or updated versions of the BFS and the FPS to the IoT modules.

The following operations 518, 520, 522, 523, 524, 526 may be performed for each IoT module and to determine whether each entry in the received potential FP lists are in the CRL.

At 518, the control module 110 determines whether a potential FP list has been received from one or more of the IoT modules. If yes, operation 520 is performed. At 520, the CRL module 115 compares an ID entry in the received potential FP list with entries in the CRL 120. At 522, the CRL module 115 determines whether the ID entry in the potential FP list is in the CRL 120. If the ID entry is not in the CRL 120, operation 523 is performed and the ID entry is identified as a false positive. If the ID entry is in the CRL 120, operation 526 is performed and the entry is identified as being revoked for the corresponding IoT device (or vehicle).

At 523, the bloom filter module 116 determines whether the ID entry in the potential FP list is in the BFS 122. If not, operation 526 is performed. If the ID entry is in the BFS 122, operation 524 is performed. At 524, the FPS module 118 adds the ID entry in the potential FP list to the FPS 124.

At 526, the control module 110 may determine whether there is another entry in the received potential FP list to compare. If yes, operation 520 is performed, otherwise operation 528 may be performed. The above tasks 520, 522, 523, 524, and 526 are performed until the FPS module 118 has updated the FPS 124 based on the ID entries in the potential FP lists received including potential FP lists received from the sending and receiving IoT modules referred to in the methods of FIGS. 6-7. At 528, the back office control module 110 sends the latest and/or updated version of the BFS 122 and/or FPS 124 to the IoT modules.

The method of FIG. 6 may begin at 600 and is performed by the sending IoT (or V2V) module. At 602, the control module 130 and/or the IoT module 132 of the sending IoT device receives and stores the initial BFS 122 and (optional) FPS 124 in the memory 136.

At 604, the control module 130 and/or IoT module 132 generates a basic safety message (BSM) for transmission to the receiving IoT device. The BSM includes a certificate as described above. At 606, the control module 130 broadcasts the BSM via the transceiver 134 and may be received by the receiving IoT device. Subsequent to operation 606, the method may end at 608.

FIG. 7 shows an operational method of a receiving IoT (or V2V) module. The method of FIG. 7 may begin at 700 and is performed by the receiving IoT (or V2V) module. At 702, the IoT module of the receiving IoT device receives and stores an initial BFS 122 and (optional) FPS 124 received from the back office station 102 in memory of the receiving IoT device.

At 704, the IoT module receives the BSM transmitted at 606 by the sending IoT module. At 706, the IoT module determines a certificate ID, an IoT ID, and/or a vehicle ID of the sending IoT module indicated in the certificate of the BSM. The certificate ID, IoT ID and/or vehicle ID is referred to below as the received ID or certificate entry c.

At 708, the BFS evaluation module of the receiving IoT device evaluates the certificate entry c of the received BSM by first querying the BFS 122' to determine if the received ID is in the BFS. The BFS 122' may be the same as the BFS 122 if the BFS 122' has not been updated to match the BFS 122. The certificate entry c is evaluated to determine if the received ID has been revoked. The BFS evaluation module executes the k hash functions of the bloom filter 150 on the received ID to determine if the received ID is in the BFS 122'. If any of the bits of the bloom filter array at the positions provided by the k hash functions are not set to 1, then c∉BFS and the certificate entry c is definitely not revoked. If all of the bits of the bloom filter array at the positions provided by the k hash functions are set to 1, then c∈BFS and the certificate entry c may or may not have been revoked.

A potential hash collision can occur resulting in a false positive. A hash collision refers to when all bits at positions provided by the k hash functions are set to 1 although the corresponding received ID has not actually been revoked. In this case, an unrevoked "false positive" may become a security hole because all IoT devices determine the certificate entry c is revoked and thus ignore messages from the sending IoT device. To rectify this issue, and to eliminate the need of the IoT devices signaling a back office station to provide an indication as to whether the certificate entry c has been revoked, the FPS 124 is generated by the back office station 102 and provided to the IoT devices and checked by the IoT devices. This also aids in overcoming time constraints and intermittent Internet connectivity issues of the IoT devices.

At 710, if the received ID is in the BFS 122' (c∈BFS), operation 711 may be performed. The BFS evaluation module may at least temporarily treat the certificate ID as revoked when in the BFS 122' and ignore BSMs coming from the sending IoT module until determining that the certificate ID is a false positive as indicated by the back office station 102. If c∈BFS, then c may have been revoked or the BFS query result was a false positive. If the received ID is not in the BFS (c∉BFS), operation 716 may be performed.

At 711, the FPS comparison module of the receiving IoT device determines whether the received ID is in the FPS 124'. The FPS 124' may be the same as the FPS 124 if the FPS 124' has not been updated to match the FPS 124 at the back office station 102. If the received ID is in the FPS 124' (c∈FPS), then the certificate is not revoked and operation 716 is performed. If the received ID is not in the FPS 124' (c∉FPS), then it is concluded (or assumed) that the certificate is revoked, until informed otherwise, and operation 712 is performed.

At 712, the FPS comparison module adds the received ID to the potential FP list. At 714, the control module and/or the IoT module of the receiving IoT device ignores the received BSM. At 716, the control module of the receiving IoT device proceeds to process the content of the received BSM.

At 718, the control module or receiving IoT module of the receiving IoT device determines whether it is time to send the potential FP list to the back office station 102. As an example, the receiving IoT module may send a potential FP list to the back office station 102 once per week via the Internet. If it is time to send the potential FP list, operation 720 is performed; otherwise operation 704 may be performed if another BSM is received or the method may end at 724. Results of certificate revocation checks are cached, such that the receiving IoT (or V2V) module does not need to repetitively check revocation status of a sending vehicle for hundreds of thousands of messages received in a short period of time.

At 720, the control module or receiving IoT module of the receiving IoT device sends the potential FP list to the back office station 102. At 721, the receiving IoT module empties the potential FP list at the receiving IoT device (or vehicle).

At 722, in response to sending the potential FP list, the IoT module may receive from the back office station 102 an updated BFS and/or an updated FPS. The BFS may indicate if the entry IDs in the potential FP list have been revoked and the FPS may indicate if the entry IDs in the potential FP list are false positives. If one or more of the entry IDs are false positives, the control module and/or IoT module of the receiving IoT device may permit communication with the sending IoT device(s) and/or reception and processing of BSMs broadcast from the corresponding sending IoT device(s). The method may end at 724 or return to operation 704 if another BSM is received.

The above-described operations of FIGS. 5-7 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples solve the CRL distribution and verification problem under the same constraints in a scalable and efficient manner. The disclosed back office control module generates a transformed version of the CRL that is much smaller than the original CRL. The transformed version is represented as a generated BFS and a generated FPS. This allows individual IoT devices (or V2V modules) with limited computer power and storage to store the BFS and FPS and perform certificate revocation checks in an efficient manner at the IoT devices (or V2v modules). A smaller amount of bandwidth is needed for transmission of the BFS and the FPS than the CRL. Querying of the BFS and the FPS is more efficient in time and space than querying the CRL due to bloom filter properties and the fact that the combined BFS and FPS is several magnitudes smaller than the CRL.

The examples may be implemented to protect all IoT devices (or vehicles) capable of performing the disclosed operations. The examples can reduce file sizes 25 times as compared to systems where an entire CRL is distributed to vehicles, resulting in reduced data transmission costs, reduced module storage costs, and reduced module processing costs. The 25 times less memory usage is illustrated by the example values in Table 2. Table 2 is an example performance comparison and applicability table. The variable O refers to the complexity of the query performed. The complexity for the CRL broadcasting technique is proportional to $\log_2(n)$ which is much more complex than the complexity of the solution, which is proportional to a constant 1.

TABLE 2

Performance Comparison

| | Naïve CRL Broadcasting Solution (assuming 40 Bytes per Revocation Record) | Our Solution (Bloom Filter Set + False Positive Set) (Assuming m/n = 10 Bits per BFS entry, k = 7 Hash Functions, then FPS rate p = 0.00819; 40 Bytes per Revocation Record in Potential False Positive List) |
|---|---|---|
| Storage and Data Transmission Requirement for Examples of Table | 2.5 Million Records: $40 * 2.5 * 10^6 = 100$ MB | Bloom Filter- 2.5 Million Records: $10 * 2.5 * 10^6 = 25$ Mb = 3.125 MB Potential False Positive List – # of False Positives (x): $x/(2.5M + x) = 0.00819 => x = 20644$ Potential False Positive Vehicle Records 40B/record*20644 Records = 0.826 MB Total Memory Usage: 3.125 + 0.826 = 3.951 MB |
| Computational Complexity Per Query for Examples of Table | Assuming CRL is Sorted, then Computation Complexity for a Query is $O(\log_2(n))$ lookups with 2.5M Records: $\log_2(2.5M) = 21.3$ lookups | BFS Lookup – O(1): k = 7 Hashing Operations When the BFS lookup returns positive, at a probability of 0.01 + 0.00819 = 0.01819, will the following may be needed (assuming Potential False Positive List comes sorted): Potential False Positive List lookup: $\log_2(20644) = 14.3$ lookups |
| Memory Required for Examples of Table | 100 MB | 3.951 MB |

The examples disclosed herein are applicable to IoT devices using public key infrastructure (PKI) security with a large number of end devices, each with limited storage and processing power and each with only occasional Internet access.

Distributing a full CRL to vehicles requires large data transmission and expensive memory and has slow associated processing time. Another approach that is not practical includes using a bloom filter and having a vehicle in real time call a back office station to check if a certificate ID is in a CRL (or a "hit") and thus check if a "possibly revoked" certificate is actually revoked or is instead a false positive. This is because the vehicle has less than a tenth of a second to validate any given certificate. This real-time Internet interaction is not possible for V2V networks where vehicles are checking hundreds of certificates per second and wide area network latency (possibly hundreds of milliseconds) would yield responses useless at certain times. Ignoring the "false positive" check excludes valid vehicles from using a V2V safety system.

Another approach that is not feasible is the use of a bloom filter while making assumptions that all hits are real revocations while ignoring the possibility of the hits being false positives. This is because if the vehicle is a false positive, the vehicle may then be forever ignored by other vehicles, thereby losing safety benefits associated with V2V communication. Another approach that is not feasible is to have the back office station determine the know false positives without vehicles uploading potential false positive lists. The back office station may check all issued certificates each time any one certificate is revoked. However, each cycle requires hundreds of millions of checks and the back office station (or central CRL maintaining office) does not know all original equipment manufacturer (OEM) generated certificates.

The examples disclosed herein overcome the above-stated issues by using an aggregated bloom filter set and false positive set instead of a full CRL to enable revocation across a population of hundreds of millions of vehicles (or IoT devices) using orders of magnitude fewer memory storage. This reduces memory costs and amount of associated bandwidth. The examples disclosed herein include vehicles collecting and periodically uploading "possibly revoked" certificate files to the back office station. The back office station uses the full CRL to identify the false positives and periodically distributes a corresponding "known false positives" file to the vehicles to supplement a provided BFS.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A first Internet of things (IoT) device comprising:
a memory configured to store
a bloom filter set including an array of bits representing entries in a certificate revocation list, and
a false positive set including a list of certificate entries falsely identified by the bloom filter set as being revoked;
a transceiver configured to receive from a first bloom filter of a back office station the bloom filter set, and to receive from a second IoT device a message, wherein the message includes a certificate;
a bloom filter evaluation module configured to receive the bloom filter set from the back office station via the transceiver and comprising a second bloom filter, the second bloom filter configured to determine whether an identifier of the certificate is deemed to be in the bloom filter set;
a false positive comparison module configured to receive the false positive set from the back office station via the transceiver and determine whether the identifier is in the false positive set; and
a control module configured to permit communication between the first IoT device and the second IoT device based on whether the identifier is deemed to be in the bloom filter set and whether the identifier is in the false positive set.

2. The first IoT device of claim 1, wherein the control module is configured to, in response to the identifier being deemed to not be in the bloom filter set, permit communication between the first IoT device and the second IoT device.

3. The first IoT device of claim 1, wherein the control module is configured to, in response to the identifier being in the false positive set, permit communication between the first IoT device and the second IoT device.

4. The first IoT device of claim 1, wherein the control module is configured to, in response to the identifier being deemed to be in the bloom filter set and not be in the false positive set, add the identifier to a potential false positive list and at least temporarily ignore communication from the second IoT device.

5. The first IoT device of claim 4, wherein the control module is configured to:
transmit the potential false positive list to the back office station; and
receive at least one of an updated version of the bloom filter set or an updated version of the false positive set.

6. The first IoT device of claim 5, wherein the control module is configured to determine whether to communicate with the second IoT device based on at least one of the updated version of the bloom filter set or the updated version of the false positive set.

7. The first IoT device of claim 1, wherein the false positive set includes identifiers of certificates not in the certificate revocation list but in one or more potential false positive lists generated by the first IoT device and at least one of the second IoT device and one or more other IoT devices.

8. The first IoT device of claim 1, wherein:
the first IoT device is implemented as a component of a first vehicle;
the second IoT device is implemented as a component of a second vehicle;
the identifier is an identifier of the second vehicle; and
the control module is implemented as a vehicle-to-vehicle communication module of the first vehicle.

9. The first IoT device of claim 1, wherein:
the second bloom filter comprises a plurality of hash functions;
the plurality of hash functions determine respective bit locations in the array of bits for the identifier; and
the bloom filter evaluation module determines the identifier to be in the second bloom filter when all bits at the bit locations of the array of bits are set to 1.

10. The IoT device of claim 1, wherein the second bloom filter is configured to perform a plurality of hash functions on the identifier to determine whether the identifier is in the bloom filter set.

11. The IoT device of claim 1, wherein each of the first bloom filter and the second bloom filter implements a plurality of hash functions, which are used to set bit values in a bloom filter array of bits representing the certificate revocation list.

12. A system comprising:
the first IoT device of claim 1; and
the back office station,
wherein the first bloom filter is configured to generate the first bloom filter set based on the entries in the certificate revocation list.

13. The system of claim 12, wherein:
the back office station comprises:
a memory configured to store the certificate revocation list, the bloom filter set, and the false positive set;
a certificate revocation module configured to generate and store in the memory the certificate revocation list; and
a false positive module configured to generate the false positive set based on a first potential false positive list received from the first IoT device or another IoT device.

14. The system of claim 12, wherein the second bloom filter is configured similarly or the same as the first bloom filter.

15. A back office station comprising:
a memory configured to store a certificate revocation list, a bloom filter set, and a false positive set, wherein the certificates revocation list includes a revoked certificate of a first Internet of Thing (IoT) device;
a certificate revocation module configured to generate and store in the memory the certificate revocation list;
a bloom filter module comprising a bloom filter and configured to generate the bloom filter set based on the certificate revocation list using the bloom filter, wherein the bloom filter set is an array of bits representative of the certificate revocation list;
a false positive module configured to generate the false positive set based on a first potential false positive list received from a second IoT device, wherein the false positive set includes identifiers associated with certificates not in the certificate revocation list but in one or more potential false positive lists, wherein the one or more false positive lists includes the first potential false positive list, and wherein the false positive set includes an identifier of a third IoT device; and
a control module configured to i) transmit the bloom filter set and the false positive set to the second IoT device to prevent communication with the first IoT device and permit communication with the third IoT device, and ii) for each entry in the first potential false positive list, a) check if the entry is in the bloom filter set and the certificate revocation list, and b) in response to the entry being in the bloom filter set and not in the certificate revocation list, update the false positive set to include the entry, wherein the bloom filter set is an array of bits representing the certificate revocation list.

16. The back office station of claim 15, wherein the control module operates in:
a first state to initialize the bloom filter set and distribute the bloom filter set to at least the second IoT device and the third IoT device;
a second state, while the bloom filter set exists and the false positive set is an empty set, update the false positive set based on the first potential false positive list and distribute the false positive set to at least the second IoT device and the third IoT device;
a third state, while the bloom filter set exists and the false positive set is not an empty set, update the false positive set based on the first potential false positive list and distribute the false positive set to at least the second IoT device and the third IoT device; and
a fourth state to update the bloom filter set and the false positive set and distribute the updated bloom filter set and the updated false positive set to at least the second IoT device and the third IoT device.

17. The back office station of claim 15, wherein:
the certificate revocation module is configured to update the certificate revocation list; and
the bloom filter module is configured to periodically update the bloom filter set based on the updated certificate revocation list.

18. The back office station of claim 15, wherein the control module is configured to, in response to receiving a new entry for the certificate revocation list, update the bloom filter set based on the new entry and remove the new entry from the false positive set.

19. The back office station of claim 15, wherein:
the bloom filter comprises a plurality of hash functions;
the plurality of hash functions are each configured to determine bit locations in the array of bits based on entries in the certificate revocation list; and
the bloom filter module is configured to set bits at the bit locations to 1 based on outputs of the plurality of hash functions.

20. The back office station of claim 19, the bloom filter module is configured to:
identify bit locations in the array of bits for an identifier of a certificate of the third IoT device; and
determine whether the identifier of the certificate of the third IoT device is in the bloom filter set based on the identified bit locations in the array of bits for the identifier; and
communicate with the third IoT device in response to the identifier of the certificate of the third IoT device not being in the bloom filter set.

* * * * *